United States Patent [19]

Sabin

[11] Patent Number: 4,796,471
[45] Date of Patent: Jan. 10, 1989

[54] TECHNIQUES USEFUL IN DETERMINING LIQUID LEVELS

[75] Inventor: Cullen M. Sabin, Solana Beach, Calif.
[73] Assignee: Thermonetics Corporation, San Diego, Calif.
[21] Appl. No.: 203,514
[22] Filed: May 2, 1988

Related U.S. Application Data

[63] Continuation of Ser. No. 929,498, Nov. 12, 1986, abandoned.

[51] Int. Cl.$^4$ ............................................. G01F 23/22
[52] U.S. Cl. .......................................... 73/295; 374/29
[58] Field of Search .......................... 73/295; 340/622; 374/29, 30

[56] References Cited

U.S. PATENT DOCUMENTS

| | | | |
|---|---|---|---|
| 1,357,850 | 11/1920 | Derr | 73/295 |
| 1,528,383 | 3/1925 | Schmidt | 374/30 |
| 3,138,023 | 6/1964 | Washburn | 73/295 |
| 3,161,050 | 12/1964 | Exner | 73/295 |
| 3,324,722 | 6/1967 | Reicks | 73/295 |
| 3,360,990 | 1/1968 | Greene et al. | 73/295 |
| 3,399,568 | 9/1968 | Wilson | 73/295 |
| 3,696,675 | 10/1972 | Gilmour | 73/295 |
| 4,358,955 | 11/1982 | Rait | 73/295 |
| 4,541,728 | 9/1985 | Hauser et al. | 374/29 |
| 4,603,580 | 8/1986 | Waring | 73/295 |

FOREIGN PATENT DOCUMENTS 0673858  7/1979  U.S.S.R. ................................. 73/295

Primary Examiner—William A. Cuchlinski, Jr.
Assistant Examiner—Thomas B. Will
Attorney, Agent, or Firm—Frank E. Mauritz

[57] ABSTRACT

Heat is used to determine liquid level in a storage tank. An elongated heater that produces heat uniformly along its length is mounted vertically on the outside surface of the tank to extend substantially the full height of the tank. An elongated thermopile having a multiplicity of hot and cold junction pairs uniformly spaced along its length covers the heater so that heat from the heater travels in two different opposite directions, namely a first portion of the heat travels from the heater through the tank wall and into the tank; the other portion of the heat travels in the opposite direction from the heater through the thermopile and then into the ambient atmosphere. A meter indicates the amount of heat flow through the thermopile and its indication changes with change in level of the liquid in the tank.

3 Claims, 3 Drawing Sheets

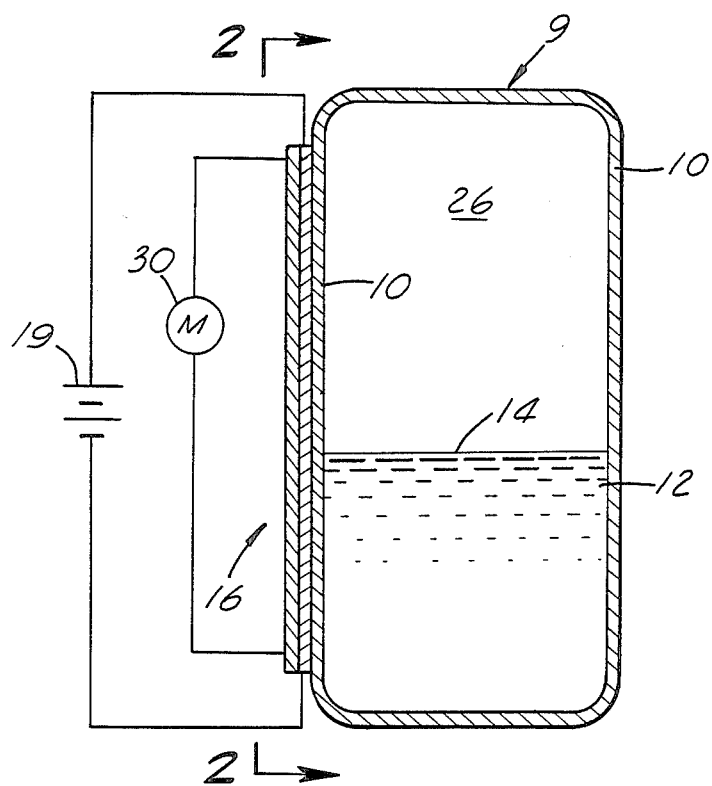
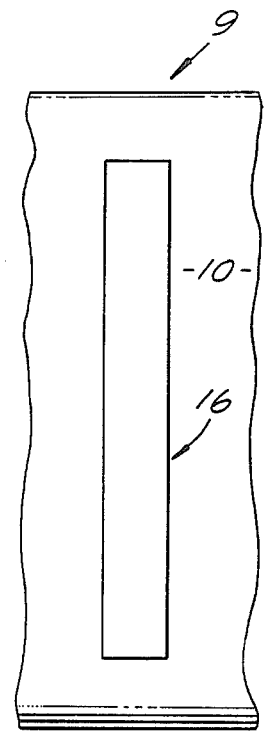
FIG. 1  FIG. 2
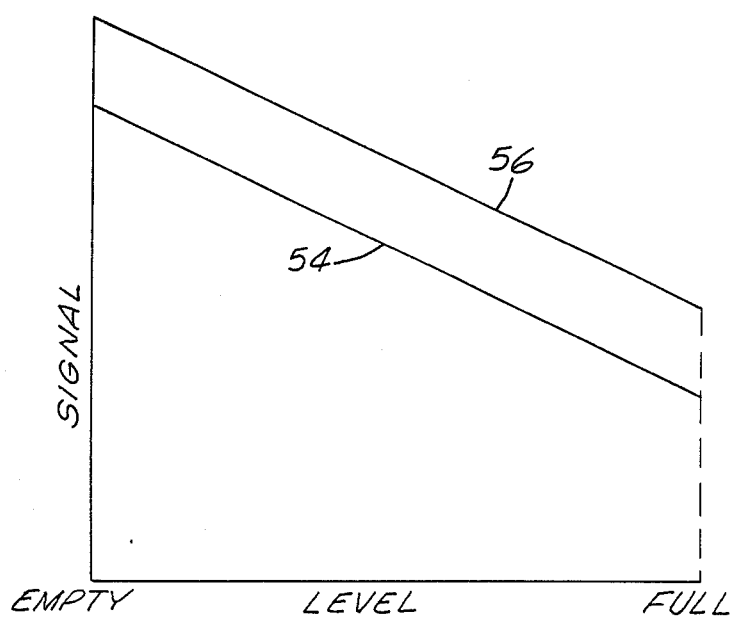
FIG. 7

TECHNIQUES USEFUL IN DETERMINING LIQUID LEVELS

This application is a continuation of my copending application Ser. No. 929,498 filed Nov. 12, 1986 for Techniques Useful In Determining Liquid Levels, now abandoned.

The present invention relates to improved means and techniques useful in determining liquid levels in closed tanks and is particularly useful in determinations of contents of pressurized tanks that contain gas fuels such as natural gas, propane, butane and the like.

Determining liquid levels in pressurized tanks presents a problem. Conventional liquid level measuring systems such as those using a float and resistance-element device in automobiles are not suitable for use in pressurized tanks. In addition, many non-pressurized fuel tanks in existing installations have no provision for determining contents, nor do they contain fittings for float type liquid level sensors. In both of these pressurized and non-pressurized installations there is a long existing need for a simple reliable liquid level sensor that is not required to be mounted inside the tank through a tank opening.

It is therefor an object of the present invention to provide a simple reliable liquid level system that is not required to be mounted inside the liquid storage tank.

Another object of the present invention is to provide an improved liquid level measuring system that has no moving parts.

Still another object of the present invention is to provide an improved liquid level measuring system that developes two heat flows, one heat flow being from a central heater to the ambient atmosphere through a thermopile which measures the quantity of such heat flowing to the ambient atmosphere, and the other heat flow being in the opposite direction from the same central heater and through the wall of the tank and then into the tank. The particular quantity of heat flow thus measured is used in effectively establishing the particular ratio of liquid to vapor and the liquid level.

Yet another object of the present invention is to provide a liquid level sensing system which can easily and readily be applied to existing pressurized tanks without requiring structural modification.

Features of the invention which are believed to be novel are set forth in the appended claims. The invention itself, both as to its organization and manner of operation together with further objects and advantages thereof, may be best understood by reference to the following description taken in connection with the accompanying drawings in which:

FIG. 1 is a section through a conventional pressurized liquid storage tank with a liquid level measuring system embodying the present invention mounted thereon, Electrical connections in such system are also illustrated.

FIG. 2 is a view in elevation taken substantially as indicated by the lines 2—2 in FIG. 1. Only a portion of the tank is illustrated.

Figure 3:
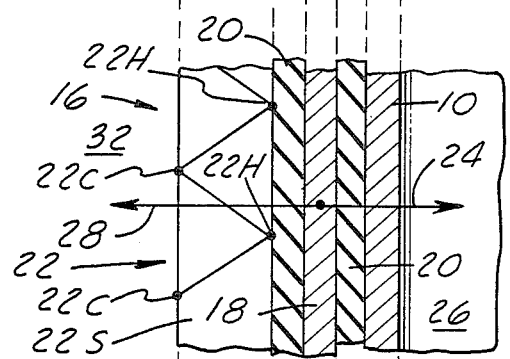
FIG. 3 illustrates in enlarged form a part of the the liquid level structure which is also illustrated in FIG. 1.
Figure 4:
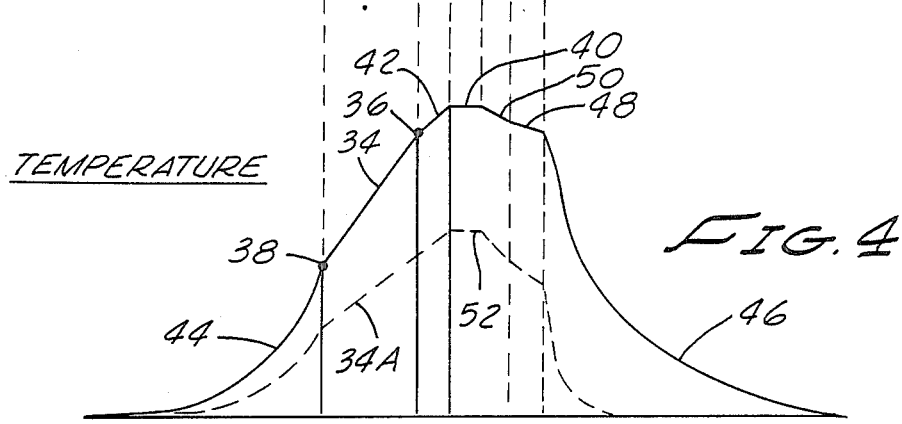

FIG. 4 immediately below FIG. 3 and correlated therewith by dotted lines extending betwee these two Figure illustrates thermal conditions between, on the one hand, the ambient atmosphere and, on the other hand, the vapor in the tank, such thermal conditions being produced by the illustrated central heater in FIG. 3. The ordinates in FIG. 4 represent temperature and the corresponding abscissae represent that spatial relationship of elements in FIG. 3 and FIG. 5 immediately above FIG. 4 and also related by like dotted lines to the spacing of elements in FIG. 3 represents thermal conditions between the ambient air and liquid in the tank when (1) no heat is being supplied to the heater of the measuring system and (2) the liquid temperature is greater than the ambient air temperature.

Figure 5:
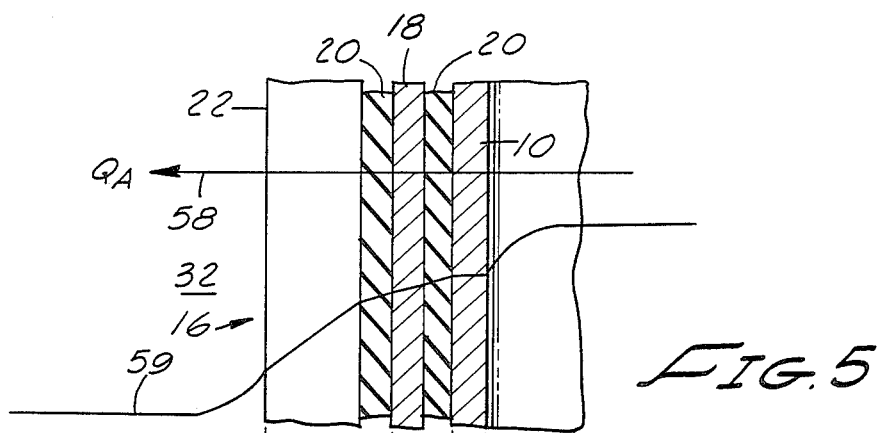
Figure 6:
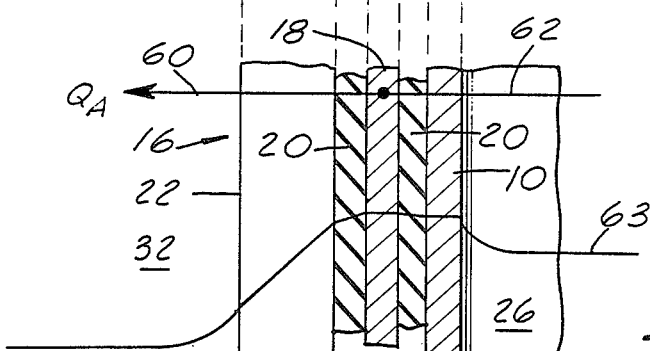

FIG. 6 immediately below FIG. 5 and also related by like dotted lines to the spacing of elements in FIG. 3 represents thermal conditions between the ambient air and liquid in the tank when (1) heat is being supplied to the heater of the measuring system and (2) the liquid temperature is greater than the ambient air temperature.

FIG. 7 illustrate two substantially linear graphs each indicating the empty-full condition of the tank, in which the output sensor signals are ordinates and the abscissae represent the corresponding degree of fullness of the tank. The abscissae extend from zero which represents an empty condition to a maximum value which represents a full condition of the tank.

Figure 8:
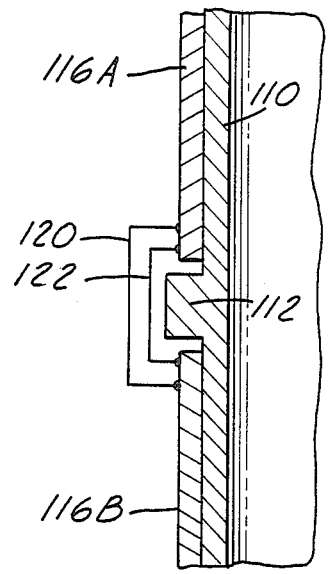

FIG. 8 illustrates the manner in which the present novel apparatus may be sectionalized and combined to be useful when the smoothness of the tank wall is interrupted by a discontinuity such as a flanged portion.

Figure 9:
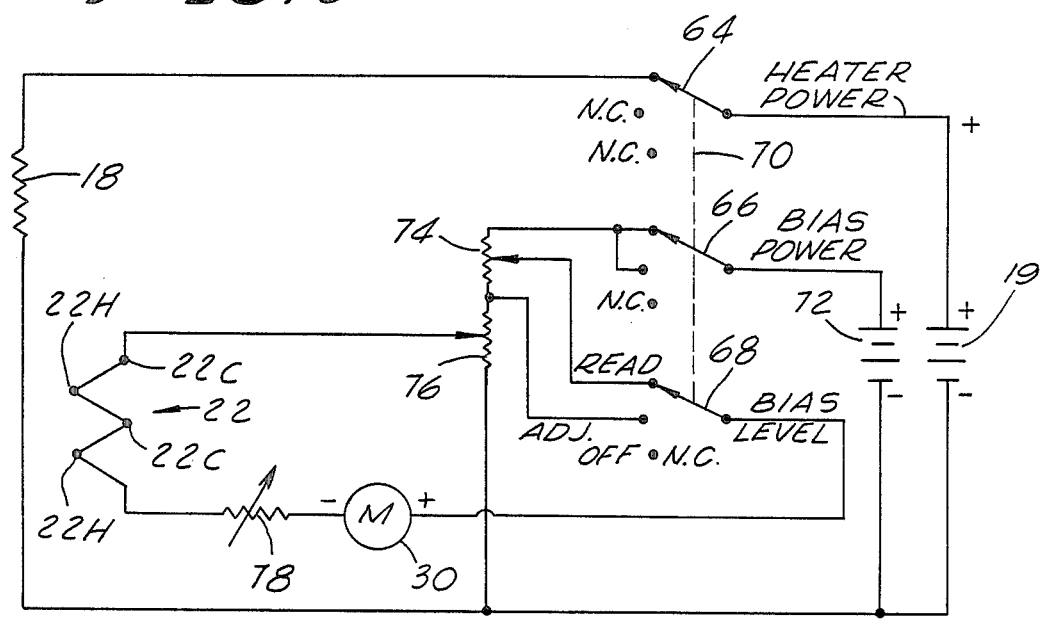

FIG. 9 is an electrical circuit diagram in which the heater, thermopile and meter may be connected to provide for adjustment to different existing temperature conditions.

In FIG. 1 a conventional pressure tank 9 having a metal wall 10 of small thickness is partially filled with liquid 12 to a level 14. Mounted on the external surface of the tank 10 and extending substantially its entire vertical height as shown in FIGS. 1–3 are elements of a liquid level measuring assembly 16 which is in the form of a composite strip that includes an electrical resistance heating element 18 encased in electrical insulation material 20 and a thermopile construction 22. These elements 18,20 and 22 may be adhesively bound together as a unit by a thin layer of good thermal conducting adhesive and this assembly 18,20,22 is externally mounted on tank 10 using a like adhesive.

The heater 18 energized by battery 19 produces a heat flow in two opposite directions, namely a first direction 24 that extends from heater 18 through insulation 20 and the metal tank wall 10 and into the contents of the tank which is liquid 12 below level 14 and vapor 26 above level 12; and in the second direction 28 which extends from heater 18, through insulation 20, thermopile 22 and into the ambient atmosphere. This thermopile 22 in conjunction with meter 30 connected thereto measures the amount of such heat flow.

The thermopile 22 includes a series of hot junctions 22H and a series of cold junctions 22C that are mounted in spaced relationship along the direction of heat flow on a strip 22S of heat insulating material. All junctions are serially connected with the meter 30 which indicates the sum of the voltages of the individual junction pairs 22H, 22c.

The construction and use of thermopiles as contemplated in the present invention for measuring the amount of heat flow i.e. heat flux (as distinct from temperature) is described perhaps more fully in the March 1969 publication in Environmental Quarterly of Heinz F. Poppendiek.

The quantity of heat flow or so-called heat flux through thermopile 22 is directly proportional to the difference in temperature between junction pairs 22H,22C and indirectly poportional to the thermal impedance of the strip 22C on which the pairs 22H,22S are disposed. This difference in temperature, the temperature gradient, is expressed in terms of the slope of the straight line 34 which extends between points 38,36 in FIG. 4. The abscissae of these points 36,38 correspond to the location of the hot junction 22H and cold junction 22C respectively in FIG. 3. The horizonal line 40 corresponds to the temperature of heater 18 and the slope of line 42 represents the quantity of heat flowing through a portion of insulation 30. The curved line 44 represents the manner in which the heat flows into the ambient atmosphere 32. The curved line 46 represents the quantity of heat flowing into the vapor 26 after it leaves the interior surface of wall 10. the slope of line 48 represents the quantity of heat flowing through the wall 10 and the slope of line 50 represents the quantity of heat flowing through the other portion of insulation 20. The lower dotted line graph 52 represents like conditions when the heater 18 is operated at a substantially lower temperature in which case the slope of line 34A is less than the slope of line 34 thereby indicating that the quantity of heat flow is correspondingly lower.

The total amount of heat developed by heater 18 divides into two quanties that flow in opposite directions. A first portion flows in the first direction 24 into the vapor 26 in tank 9; the remaining portion of the heat developed in heater 18 flows in the opposite firection 28 through the thermopile 22 and then into the ambient atmosphere 32.

It is important to realize that this division of heat flow is dependent upon whether the heat flow in direction 24 terminates in either the liquid below level line 14 or in the space above line 14. In the former case the flow of heat per unit length of heater 18 into the liquid is greater than is the comparable flow into vapor above line 14 and correspondingly the flow in the opposite direction 28 through a particular junction pair 22H,22C which is located below the level line 14 is less than the flow of heat through a different particular junction pair 22H,22C which is located above the level line 14. In other words as the liquid level lowers the output indicated by meter 30 increases. This relationship is illustrated in FIG. 7 by substantially straight line 54. Line 54 represents the condition when the liquid temperature is substantially equal to the ambient air temperature. When the temperature of the liquid is greater than the temperature of the ambient atmosphere the relationship is then represented by line 56.

In FIG. 7 the greatest ordinate represents an empty tank and the smallest ordinate represents a full tank. It is noted that when the tank is either empty or full the meter 30 still indicates a heat flow through the thermopile 22 from heater 18.

The system is sensitive to changes in ambient temperature and sensitive to changes in liquid temperature. Means shown in FIG. 9 are provided as explained later for achieving compensation for such changes. FIGS. 5 and 6 illustrate results of changes for which compensation is desired.

FIG. 5 illustrates the condition where the heater 18 is inoperative and the temperature of the liquid exceeds the ambient air temperature in which case there is a unidirectional flow of heat that is indicated by the arrow 58. The heat flow through the different mediums is illustrated by the graph 59.

FIG. 6 illustrates the same conditions represented in FIG. 5 but in this case the heater 18 is operative and there is a bidirectional heat flow that is represented by oppositely directed arrows 60,62. The resulting heat flow through the different mediums is represented by the graph 63.

It will be seen that the measuring assembly 16 is in the form of an elongated strip that includes the coextensively extending heater 18 for producing a uniform heat along its length and the thermopile 22 which includes a multiplicity of hot and cold junction pairs unifomily spaced along its length and that some means such as a good heat conducting adhesive may be disposed between the heater and the thermopile so that these two elements may be handled as a single unit which in turn may be mounted on the tank wall by suitable means that likewise may be an adhesive.

FIG. 8 involes a tank 110 that has a non-uniformity 112 in its outer otherwise smooth surface. It may be a weld or a flange as illustrated. In such case the measuring assembly is sectionalized to provide an upper section 116A above the flange 112 and a section 116B below the flange 112. A wire 120 interconnects the heater wire 18 of each section and another wire 122 interconnects wires to meter 30.

Preferably electrical circuitry illustrated in FIG. 9 is provided for adjustment to different temperature conditions. Included are three ganged switches 64, 66 and 68, each of which has three positions and have their switch arms mechanically interconnected as indicated by the dotted line 70 for movement as a unit. The lowermost position of the interconnected arms corresponds to an OFF position and condition.

In the intermediate or BIAS ADJUST position of the switches: the arm of switch 64 disconnects the heater battery 19 from heater 18; the arm of switch 66 connects the ungrounded terminal of bias battery 72 to the ungrounded terminal of the series connected potentiometer 74 and 76; and the arm of switch 68 is connected to the junction point of the potentiometers 74,76.

In the uppermost or READ position of the switch arms: the arm of switch 64 connects the ungrounded terminal of battery 19 to the ungrounded terminal of heater 18; the arm of switch 66 still connects the ungrounded terminal of bias battery 72 to the ungrounded terminal of the series connected potentiometer 74,76; and the arm of switch 68 is now connected to the adjustable tap on potentiometer 74.

The arm of switch 68 is connected to one terminal of the series circuit that includes the meter 30, an adjustable resistance 78 and the thermopile 22, the other terminal of such series circuit being connected to the adjustable tap on potentiometer 76.

The adjustment procedure to achieve an initial calibration involves:

1. With the tank empty, the arms of the ganged switches 64,66, and 68 are moved to their intermediate positions for a zero 2 adjustment. The tap on potentiometer 76 is adjusted so that the meter 30 indicates an "empty" condition. This adjustment nulls out effects of ambient temperature derived heat flows.

2. The ganged arms of switches 64,66, and 68 are then moved to their uppermost READ position to initiate heating of the heater 18. After heating conditions stabilize as indicated by a stablized indication on meter 30, the tap on potentiometer 74 is adjusted until the meter 30 again indicates empty. This adjusts the amount of bias voltage that is applied to the meter 30. This adjustment serves to match bias voltage to tank wall characteristics, heater length, and other installation variables. After this adjustment is made the arms of the switches are returned to their intermediate position and the tank is filled with liquid to its full condition.

3. After the tank is completely filled and the arms of the switchws are in their intermediate position the tap on potentiometer 76 is adjusted so that meter 30 reads empty. This adjustment nulls out effects of filling the tank with liquid that is not at ambient air tempersture.

4. The arms of the switches are then moved to their uppermost Read position and the span range adjust resistance 78 is adjusted until the meter 30 indicates full.

Once calibrated, routine determination of liquid level involves moving the ganged switch arms to their intermediate BIAS ADJUST position and adjusting the tap on potentiometer 76 to obtain an empty indication on meter 30 after which the switch arms are moved to their uppermost READ position and then after temperature conditions are allowed to stabilize the indication on meter 30 is an indication of liquid level.

While particular embodiments of the invention have been shown and described, it will be obvious to those skilled in the art that changes and modifications may be made without departing from the invention in its broader aspects and, therefor the aim in the appended claims is to cover all such changes and modifications as fall within the true spirit and scope of the invention.

I claim as my invention:

1. In a liquid level determining system for liquids in a storage tank that has an external surface exposed to the ambient atmosphere wherein the improvement comprises, an elongated heater producing heat uniformly along its length, an elongated thermopile having a multiplicity of hot and cold junction pairs extending uniformly along its length adjacent to and coextensively with said elongated heater, said heater being a strip electrical resistance heating element that has two flat sides, one flat side of which is mountable on said external tank surface and the other flat side of which has said elongated thermopile mounted thereon, and means mounting said thermopile on said heating element so that when said heating element is mounted on said surface a first portion of the heat produced by said heater element flows in a first direction directly into said tank and a second portion of the heat produced by said heater flows in a second opposite direction through said thermopile in a path which extends through one of said hot junctions, then through one of said cold junctions and then into the ambient atmosphere, said heater producing insufficient heat to significantly raise the temperature of said tank.

2. The combination set forth in claim 1 including said storage tank for storing liquid therein, said tank having a vertical external surface, means for mounting said heater vertically on said external surface of said tank to extend substantially the full height of said tank so that the heater produces said first and said second heat portions, said first of which flows from the heater into said tank and the second of which flows through said thermopile into the ambient air surrounding said tank, the relative intensities of said first portion and said second portion changing and being dependent upon the level of liquid in said tank, and means for indicating the quantity of said second portion flowing through said thermopile in a path which extends through one of said hot junctions, then through one of said cold junctions and then into said ambient atmosphere, said heater producing insufficient heat to significatly raise the temperature of said tank.

3. In a method of determining liquid level in a storage tank that has an external surface exposed to the ambient atmosphere, the steps comprising, producing heat externally of the tank so that a first portion of the produced heat flows directlty into the tank and a second portion flows into the ambient atmosphere that surrounds the tank with the relative intensities of said first portion and said second portion changing and being dependent upon said liquid level, and indicating the quantity of said second portion of heat flow to thereby produce an indication of said liquid level, the amount of heat produced being insufficient to significantly raise the temperature of the tank.

* * * * *